(12) United States Patent
Arieli et al.

(10) Patent No.: US 6,707,608 B1
(45) Date of Patent: Mar. 16, 2004

(54) DIFFRACTIVE OPTICAL ELEMENT AND A METHOD FOR PRODUCING SAME

(75) Inventors: Yoel Arieli, Jerusalem (IL); Shay Wolfling, Kfar-Azar (IL)

(73) Assignee: Nano-Or Technologies (Israel) Ltd., Lod (IL)

( * ) Notice: Subject to any disclaimer, the term of this patent is extended or adjusted under 35 U.S.C. 154(b) by 0 days.

(21) Appl. No.: 09/529,007
(22) PCT Filed: Oct. 4, 1998
(86) PCT No.: PCT/IL98/00485
§ 371 (c)(1),
(2), (4) Date: Feb. 20, 2001
(87) PCT Pub. No.: WO99/18458
PCT Pub. Date: Apr. 15, 1999

(30) Foreign Application Priority Data

Oct. 7, 1997 (IL) .................................................. 121912

(51) Int. Cl.[7] .............................................. G02B 5/18
(52) U.S. Cl. ...................................... 359/569; 359/576
(58) Field of Search .............................. 359/15, 16, 19, 359/565, 566, 569, 575, 576

(56) References Cited

U.S. PATENT DOCUMENTS

| | | | | |
|---|---|---|---|---|
| 4,210,391 A | * | 7/1980 | Cohen | 351/161 |
| 4,245,882 A | | 1/1981 | Chang | 359/19 |
| 5,071,207 A | * | 12/1991 | Ceglio et al. | 359/15 |
| 5,300,190 A | * | 4/1994 | Sugimoto et al. | 156/653 |
| 5,446,588 A | | 8/1995 | Missig et al. | 359/565 |
| 5,847,877 A | * | 12/1998 | Imamura et al. | 359/566 |
| 6,157,488 A | * | 12/2000 | Ishii | 359/569 |

FOREIGN PATENT DOCUMENTS

| | | |
|---|---|---|
| DE | 195 33 591 | 3/1996 |
| WO | 96 00912 | 1/1996 |

OTHER PUBLICATIONS

Arieli Y et al.: "Design of diffractive optical elements for multiple wavelengths" Applied Optics, vol. 37, No. 26, Sep. 10, 1998, pp. 6174–6177.

Ebstein Steven M: "Achromatic Diffractive Optical Elements" Proceedings of the SPIE: Diffractive and Holographic Optics Technology, vol. 2402, Feb. 9–10, 1995, pp. 211–216.

Arieli Y et al.: "Design of A Diffractive Optical Element For Wide Spectral Bandwidth", Optics Letters, vol. 23, No. 11, Jun. 1998, pp. 823/824.

* cited by examiner

Primary Examiner—Mark A. Robinson
Assistant Examiner—Alessandro Amari
(74) Attorney, Agent, or Firm—Banner & Witcoff, Ltd.

(57) ABSTRACT

The invention provides a method for producing a diffractive optical element, including forming first and second gratings, substantially in mutual registration, of at least first and second optical materials, such that for predetermined two or more wavelengths, the diffractive optical element has desired phase retardations, thereby avoiding the generation of chromatic aberrations. The invention further provides a diffractive optical element.

66 Claims, 4 Drawing Sheets

DIFFRACTIVE OPTICAL ELEMENT AND A METHOD FOR PRODUCING SAME

FIELD OF THE INVENTION

The present invention relates generally to optical components and systems, and specifically to diffractive optical elements and optical phase elements.

BACKGROUND OF THE INVENTION

Optical imaging systems using lenses or materials transmitting light in general have to deal with the problem of dispersion of the light. Dispersion is the change of light velocity with wavelength, and dispersion causes chromatic aberrations in the optical system by creating different refractive indices and different phase changes for different wavelengths.

The phase delay φ in light of wavelength λ introduced by a thickness d of material of refractive index n is given by:

$$\phi = \frac{2\pi}{\lambda}(n-1)d \qquad (1).$$

Diffractive systems, for directing and focusing beams of light, are well-known in the art, as described, for example, by Francis Jenkins and Harvey White in *Fundamentals of Optics*, Fourth Edition, pp. 385–386 (1981), which is incorporated herein by reference. The theory of diffractive optical elements (DOEs) is further described, for example, by Nieuborg, et al., in an article entitled "Polarization-Selective Diffractive Lenslet Arrays," published in *European Optical Society Topical Meeting Digest Series*, Vol. 5 (1995), which is also incorporated herein by reference. DOEs are generally highly dispersive.

Zone plates are a well-known type of DOE, typically comprising concentric rings having radii proportional to the square roots of the whole numbers and a phase retardation varying by π between neighboring rings. When a beam of collimated light is incident on the zone plate, it will be diffracted to a focal point. Like other DOEs and computer-generated holograms known in the art, however, zone plates known in the art are highly chromatically dispersive.

SUMMARY OF THE INVENTION

It is an object of the present invention to provide methods for designing and producing diffractive optical elements having a desired wavelength dispersion.

It is a further object of the present invention to provide optical elements designed and/or produced in accordance with these methods.

In one aspect of the present invention, diffractive optical elements are designed and produced so as to be substantially achromatic, i.e., so that their dispersion is effectively minimized.

It is another object of the present invention to provide diffractive optical elements which compensate for chromatic aberrations. Thus, in one aspect of the present invention, diffractive optical elements are applied to a refractive element, such as a lens, to reduce or remove the chromatic aberrations present because of the dispersive properties of the refractive element.

It is a still further object of the present invention to provide an aberration-corrected, diffractive optical element and a method for producing same for a wideband light source.

In preferred embodiments of the present invention, a DOE comprises first and second gratings substantially in mutual registration. The gratings are made of respective first and second materials having respective first and second refractive indices. The dimensions of the gratings, in particular their thicknesses, are chosen so as to give a desired value of wavelength dispersion and/or phase retardation. Preferably, the refractive indices and the dimensions of the gratings are chosen so as to reduce or minimize chromatic aberrations produced by the DOE or by an optical system including the DOE. Such embodiments differ from DOEs known in the art, which typically are designed for a narrow wavelength range and are highly wavelength dispersive.

In some preferred embodiments of the present invention, a DOE is formed on a surface of a lens by etching the first grating into the surface of the lens, overlaying the grating with the second material having a different refractive index from that of the lens, and then etching the second grating into the second material, in registration with the first grating. Alternatively, the second material may first be overlaid on the surface of the lens, and then both the first and second gratings may be etched simultaneously. The DOE preferably corrects for the chromatic dispersion of the lens.

In other preferred embodiments of the present invention, the DOE is formed on a surface by overlaying the surface with a layer of the first optical material, overlaying the first optical material with a layer of the second optical material, and etching the gratings in registration into both optical materials.

In still other preferred embodiments of the present invention, a DOE is formed by etching the first grating into a first surface of a flat plate formed from two materials having different refractive indices, and the second grating is etched in registration with the first grating into the second, opposite surface of the flat plate. DOEs in accordance with these preferred embodiments may be designed to function as substantially dispersionless diffraction gratings or diffractive focusing elements.

In still other preferred embodiments of the present invention, a DOE is formed by combining in registration a plurality of DOEs, each DOE of the plurality being formed as described above.

In some preferred embodiments of the present invention, the DOE is generated by computer calculation and fabricated, alternatively or in combination, by a lithographic process or a plasma-etch process.

The principles of the present invention may thus be applied both in diffractive optical systems and in hybrid systems that mix diffractive and refractive optics, using any suitable methods of design and fabrication known in the art. Although the preferred embodiments described herein relate primarily to achromatization of such optical systems, the principles of the present invention may be applied more generally to control the chromatic response of such systems in substantially any desired manner, for example, to create a desired chromatic dispersion.

Although preferred embodiments are largely described herein with reference to optical wavelengths of radiation, it will be appreciated that similar embodiments of the present invention may generally be constructed utilizing materials operating at non-optical wavelengths such as ultraviolet, infrared, microwave and radio wavelengths.

Furthermore, although preferred embodiments are described herein with reference to two layers of gratings, it will be appreciated by those skilled in the art that similar preferred embodiments may generally be constructed using additional layers of gratings.

There is therefore provided, in accordance with a preferred embodiment of the present invention, a method for producing a diffractive optical element, comprising forming first and second gratings, substantially in mutual registration, of respective at least first and second optical materials, such that for predetermined two or more wavelengths, the diffractive optical element has phase retardations in a desired mutual relation, thereby avoiding the generation of chromatic aberrations.

The invention further provides a diffractive optical element, comprising first and second optical materials in which respective first and second phase gratings are formed substantially in mutual registration, such that for predetermined wavelengths the diffractive optical element has desired phase retardations, whereby generation of chromatic aberration is avoided.

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

DETAILED DESCRIPTION OF PREFERRED EMBODIMENTS

Figure 1A:
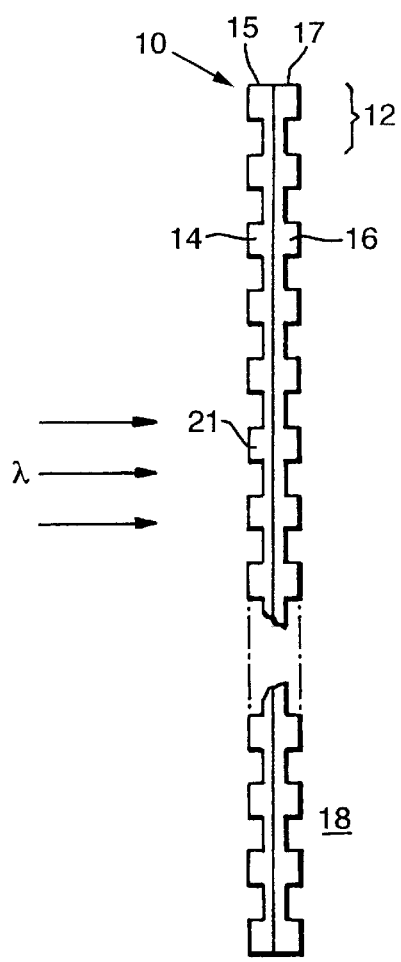
FIG. 1A is a schematic, sectional illustration of a DOE in accordance with a preferred embodiment of the present invention.
Figure 1B:
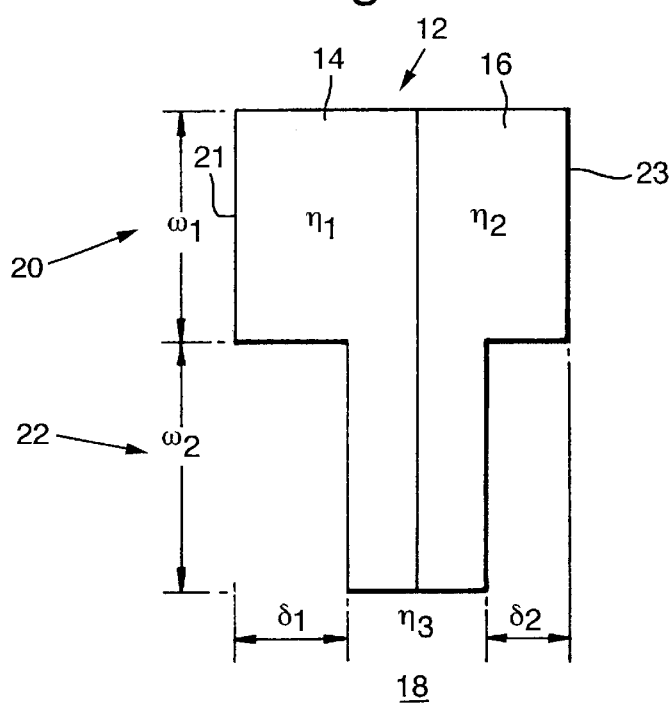
FIG. 1B is a schematic, sectional illustration of a detail of an element of FIG. 1A.

Reference is now made to FIGS. 1A and 1B, which respectively illustrate a generalized representation of a DOE 10 in sectional view and a detail showing a single element 12 thereof. DOE 10 preferably comprises a computer-generated hologram, but the description that follows is similarly applicable to other types of DOEs. DOE 10 is generally made up of a grid of elements 12, also referred to as pixels, which are preferably rectangular when viewed face-on.

DOE 10 comprises a first two-dimensional grating 14 and a second two-dimensional grating 16, in mutual registration, respectively formed from a first material 15 having a refractive index $n_1$ and a second material 17 having a refractive index $n_2$. Thus, as seen in FIG. 1B, each element 12 includes respective sub-elements of both of gratings 14 and 16. DOE 10 is surrounded by an ambient material 18 having a refractive index $n_3$. Generally, but not exclusively, material 18 may be considered to be air or vacuum, so that $n_3=1$.

A coherent plane wavefront of wavelength $\lambda$ in material 18 is perpendicularly incident from the left onto a first side 21 of element 12 of DOE 10. In general, the phase retardation of the wave emerging at the opposite side 23 of the DOE from region 20 and from region 22 will be different. From equation (1) the difference in phase retardation $\phi$ will be given by:

$$\phi = \frac{2\pi}{\lambda}\{(n_1 - n_3)d_1 + (n_2 - n_3)d_2\} \qquad (2)$$

wherein $d_1$ and $d_2$ are the respective substantially uniform depths of gratings 14 and 16, for element 12, as shown in FIG. 1B.

Calculating the derivative of $\phi$ with respect to $\lambda$, and setting the derivative equal to zero, gives:

$$\left\{\left[\frac{dn_1(\lambda)}{d\lambda} - \frac{n_1(\lambda)}{\lambda}\right] - \left[\frac{dn_3(\lambda)}{d\lambda} - \frac{n_3(\lambda)}{\lambda}\right]\right\}d_1 = \qquad (3)$$
$$\left\{\left[\frac{n_2(\lambda)}{\lambda} - \frac{dn_2(\lambda)}{d\lambda}\right] + \left[\frac{dn_3(\lambda)}{d\lambda} - \frac{n_3(\lambda)}{\lambda}\right]\right\}d_2$$

Equations (2) and (3) may be solved for $d_1$ and $d_2$ as follows:

$$d_1 = \frac{\lambda \times \phi}{2\pi}\left[(n_1 - n_3) + \frac{(n_2 - n_3)\left(n_3 - \lambda\frac{dn_3}{d\lambda} - n_1 + \lambda\frac{dn_1}{d\lambda}\right)}{\left(n_2 - \lambda\frac{dn_2}{d\lambda} - n_1 + \lambda\frac{dn_1}{d\lambda}\right)}\right]^{-1} \text{ and} \qquad (4)$$

$$d_2 = \frac{\lambda \times \phi}{2\pi}\left[(n_2 - n_3) + \frac{(n_1 - n_2)\left(n_2 - \lambda\frac{dn_2}{d\lambda} - n_{31} + \lambda\frac{dn_3}{d\lambda}\right)}{\left(n_2 - \lambda\frac{dn_3}{d\lambda} - n_1 + \lambda\frac{dn_1}{d\lambda}\right)}\right]^{-1} \qquad (5)$$

When $d_1$ and $d_2$ obey the above equations for a given wavelength $\lambda$ and phase retardation $\phi$, element 12 of DOE 10 will have a dispersion at the given wavelength substantially equal to zero. If the equations are solved for a central wavelength, for example, $\lambda=550$ nm, element 12 will be substantially achromatic over a range of wavelengths surrounding the central wavelength. Assuming gratings 14 and 16 to comprise FK54 and SF59 Schott glasses, respectively, with thicknesses $d_1=5.63$ $\mu$m and $d_2=2.28$ $\mu$m, and $w_1=w_2=1$ $\mu$m, it has been found that $\phi$ varies by only about $\pm 2\pi/30$ over the range of wavelengths from 470 to 685 nm. Since DOE 10 comprises a plurality of elements 12, each element achromatized in accordance with the above equations, DOE 10 will be substantially achromatic over the range of wavelengths from 470 to 685 nm.

Figure 1C:
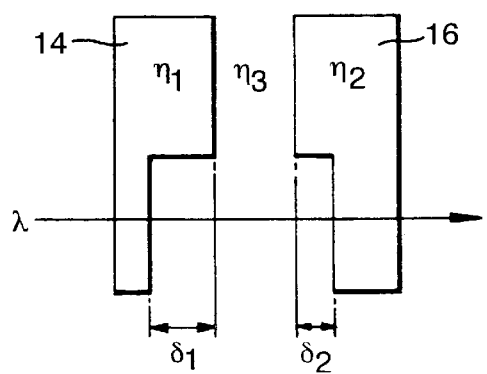
FIG. 1C is a schematic, sectional illustration of a DOE with gratings aligned in a different manner.

FIG. 1C illustrates a slight modification of the alignment of the first and second gratings 14 and 16. While in FIG. 1A, the gratings 14 and 16 are aligned 'back-to-back' and contact each other, according to FIG. 1C the gratings 14 and 16 are aligned with an air gap $n_3$ between them. The calculation of the phase retardation $\phi$ as a function of the wavelength $\lambda$ is the same as with respect to the embodiment of FIGS. 1A and 1B.

Figure 2:
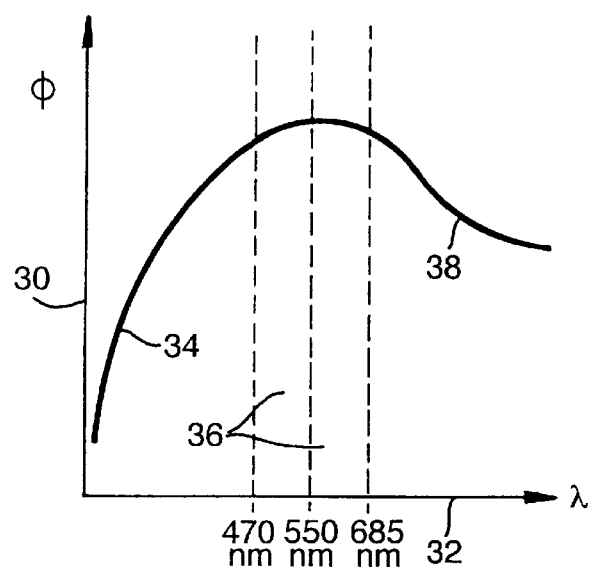
FIG. 2 is a graph showing phase change as a function of wavelength generated by an element of the DOE of FIG. 1A.

FIG. 2 is a graph of $\phi$ versus $\lambda$ for element 12 of DOE 10, assuming the above values of grating thicknesses and refractive indices. The relative phase retardation $\phi$ is plotted on axis 30 as a function of the wavelength $\lambda$ of the incident radiation, plotted on axis 32.

The graph of FIG. 2 demonstrates that there are three general regions for the variation of $\phi$ with $\lambda$: a dispersive region 34, corresponding to values of $\lambda$ less than about 470 nm, where $\phi$ is generally increasing with $\lambda$; a generally non-dispersive region 36 corresponding to values of $\lambda$ between about 470 nm and 685 nm, where $\phi$ is generally constant with $\lambda$; and a dispersive region 38, corresponding to values of $\lambda$ greater than about 685 nm, where $\phi$ is generally decreasing with $\lambda$.

It will thus be appreciated that the preferred embodiment of the present invention described with reference to FIGS. 1A and 1B corresponds to region 36 of the graph of FIG. 2. It should also be understood that the general form and properties of the graph of FIG. 2 will be applicable to elements generally represented by FIG. 1B, with values chosen for $d_1$, $d_2$, $n_1$ and $n_2$ that are generally different from the values for the preferred embodiment of the present invention represented by FIG. 1A.

Furthermore, by suitable choices of materials 15 and 17 and control of thicknesses $d_1$ and $d_2$, the shape and inflection points of the graph of FIG. 2 may be varied, so that the graph will have desired values and slopes at certain predetermined design wavelengths.

Figure 3:
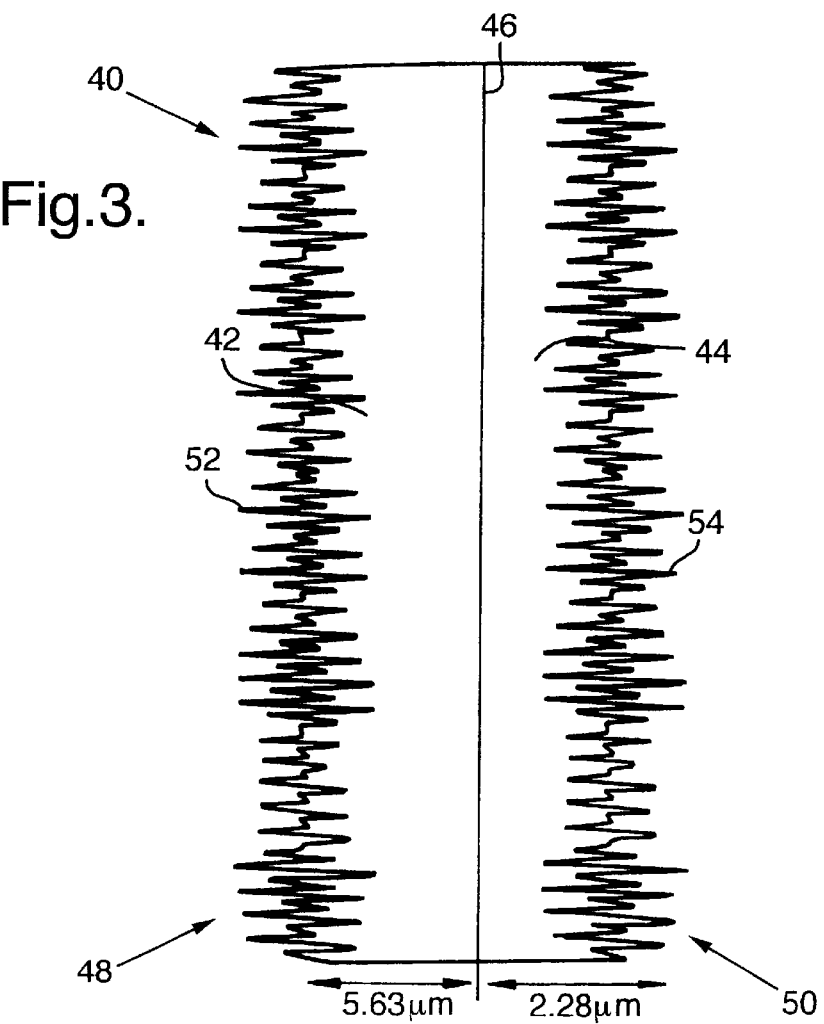
FIG. 3 is a schematic, sectional illustration of a DOE in accordance with another preferred embodiment of the present invention.

FIG. 3 schematically illustrates a DOE 40, comprising a substantially achromatic zone plate, in accordance with another preferred embodiment of the present invention, shown in sectional view.

DOE 40 comprises a first refractive material 42, preferably Schott glass SF59, and a second refractive material 44, preferably Schott glass FK54, having a common surface 46. DOE 40 is generally circular, with a diameter of the order of 4 mm. Materials 42 and 44 have respective gratings 48 and 50 etched into their respective outer surfaces 52 and 54, to maximum respective depths 2.28 $\mu$m and 5.63 $\mu$m. Gratings 48 and 50 are generated according to a computer program, incorporated herein below as Appendix A, for calculating the results of equations (4) and (5) so that the DOE functions as a substantially achromatic zone plate of focal length 1 cm for light of all wavelengths from 470 nm to 685 nm. The depths at any specific position are illustrated schematically in FIG. 3 and are given precisely by the computer program.

Gratings 48 and 50 are preferably etched into outer surfaces 52 and 54, using photolithographic techniques known in the art. Most preferably, a dual surface mask aligner is used to ensure that the gratings are substantially mutually registered. Alternatively or additionally, the gratings may be molded into the surfaces using masters, which are themselves produced using methods of photolithography, as is likewise known in the art.

Figure 4A:
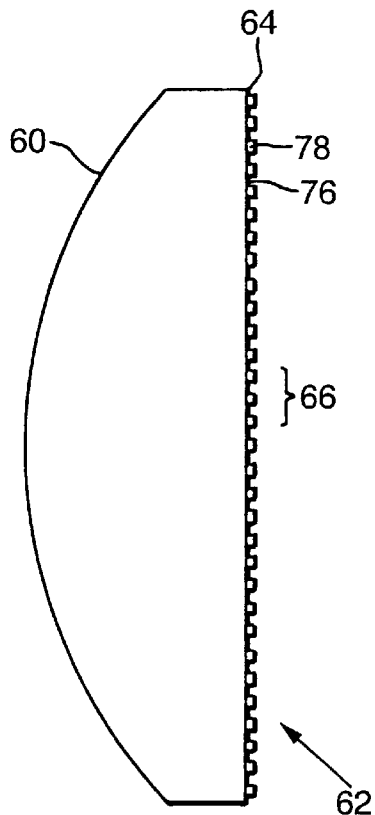
FIG. 4A is a schematic, sectional illustration of a lens having a DOE formed in a surface thereof, in accordance with a preferred embodiment of the present invention.
Figure 4B:
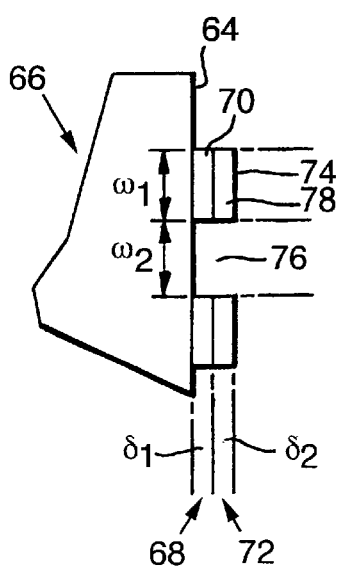
FIG. 4B is a schematic, sectional illustration of a detail of an element of the lens of FIG. 4A.

FIGS. 4A and 4B schematically show a generalized representation of a lens 60 having a DOE 62 overlaid on a surface 64 thereof, in accordance with another preferred embodiment of the present invention. Lens 60, made of any suitable optical glass known in the art, typically has chromatic aberration, with relative phase shift of transmitted waves generally decreasing with increasing wavelength. FIG. 4A is a side, sectional view illustrating the DOE on surface 64. FIG. 4B shows a sectional element 66 of the lens of FIG. 4A. DOE 62 comprises a plurality of elements 66.

Lens surface 64 is overlaid with a first coating 70 having refractive index $n_1$ and a second coating 74 having refractive index $n_2$, preferably using vacuum deposition techniques. Gratings 68 and 72 are then etched into the coated layers, preferably using photolithographic techniques. Element 66 comprises a region 78 and a region 76. Region 78 comprises a section of grating 68, of thickness $d_1$ and width $w_1$, overlaid by a section of grating 72, of thickness $d_2$ and width $w_1$. $d_1$ and $d_2$ are set so that the phase retardation of element 66 lies in region 34 of FIG. 2, corresponding to a general increase of phase retardation $\phi$ with wavelength $\lambda$. Segment 76 preferably comprises a section of grating 68 of generally negligible thickness, overlaid by a section of grating 72 of generally negligible thickness.

Radiation passing through lens 60 is incident on surface 64, passes through DOE 62 and exits to the right. The chromatic aberration of lens 60 creates a general decrease of phase retardation $\phi$ with wavelength $\lambda$ of radiation passing through the lens and incident on surface 64. To the right of surface 64, element 66 creates an increase in phase retardation $\phi$ with wavelength $\lambda$. Each of elements 66 of DOE 62 is designed, based on the equations (4) and (5), so that the net resultant phase retardation $\phi$ is approximately zero. Thus, the addition of DOE 62 to lens 60 substantially reduces the chromatic aberration of the lens 60.

Figure 5A:
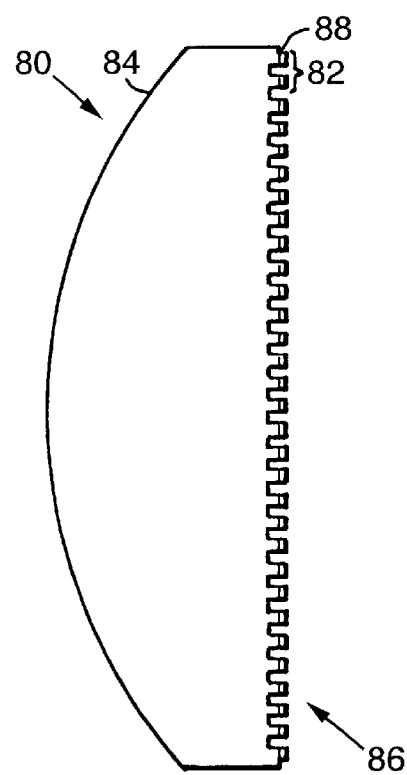
FIG. 5A is a schematic, sectional illustration of another lens having a DOE formed in a surface thereof, in accordance with a preferred embodiment of the present invention.
Figure 5B:
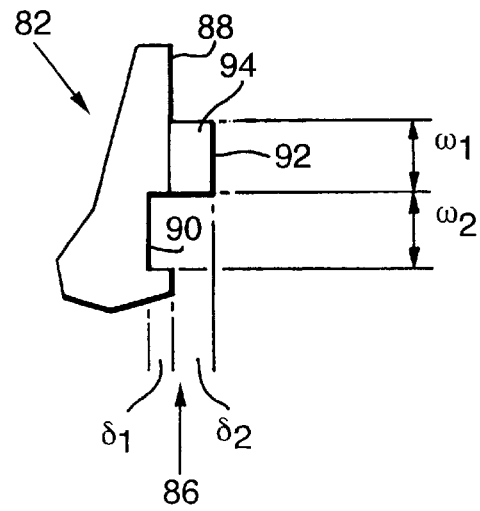
FIG. 5B is a schematic, sectional illustration of a detail of an element of the lens of FIG. 5A.

FIGS. 5A and 5B schematically illustrate another optical element 80 in sectional view, in accordance with a preferred embodiment of the present invention. FIG. 5B shows a sectional detail of an element 82 of FIG. 5A. Optical element 80 preferably comprises a lens 84, similar to lens 60, formed of a material having refractive index $n_1$. A DOE 86, comprising a plurality of elements 82, is formed on a surface 88 of lens 84 to correct the chromatic aberration of the lens. DOE 86 serves to compensate for chromatic aberration in lens 85, so that optical element 80 is substantially achromatic, like lens 60, as described above.

To form element 82 of DOE 86, zone 90 of lens 84 is etched to a depth d, into surface 88. Zone 90 has a width $w_2$ preferably of the order of 1 $\mu$m. Superimposed to a depth $d_2$ on the non-etched section of surface 88 is a second zone 92, formed of a second material having refractive index $n_2$. Zones 90 and 92 are in mutual registration, thus forming element 82.

Element 80 is preferably fabricated by first molding and/or grinding lens 84, and then coating lens surface 88 with a layer of material 94 to a depth greater than or equal to $d_2$, preferably by vacuum deposition, or using another technique known in the art. Depths $d_2$ for region 92 and $d_1+d_2$ for region 90 are then etched into the coated lens surface for each of the plurality of elements 82, preferably by photolithography.

Alternatively, element 80, including DOE 86, may be formed using precision molding techniques known in the art. In this case, lens 84 and material 94 preferably comprise optical plastics, as are known in the art.

It will be appreciated that while the preferred embodiments of thee present invention described above have used DOEs fabricated to conform to region 34 of FIG. 2, in order to correct chromatic aberration in the base lenses caused by a decrease in phase retardation with wavelength, other preferred embodiments of the present invention can be fabricated to conform to region 38 of FIG. 2, in order to correct chromatic aberration in the base lenses caused by an increase in phase retardation with wavelength.

Although the above preferred embodiments comprise transmissive optical elements operating in the visible domain, it will be appreciated by those skilled in the art that the principles of the present invention may be applied to produce other types of elements, such as reflective elements. Furthermore, diffractive optical elements may be produced in accordance with the principles of the present invention for use in other regions of the electromagnetic spectrum, as well as with other forms of radiation, such as ultrasonic radiation.

The term "optical element" as used in the present patent application and in the claims, is therefore to be understood to include elements for controlling a beam of radiation of any applicable type and/or wavelength.

Conventional computer-generated holograms (DOEs) operate at the specific wavelength for which they were designed. Operating at another wavelength will thus cause chromatic aberration. Since many potential DOE applications require the simultaneous use of more than one wavelength, correction of the chromatic aberration is required.

Figure 6:
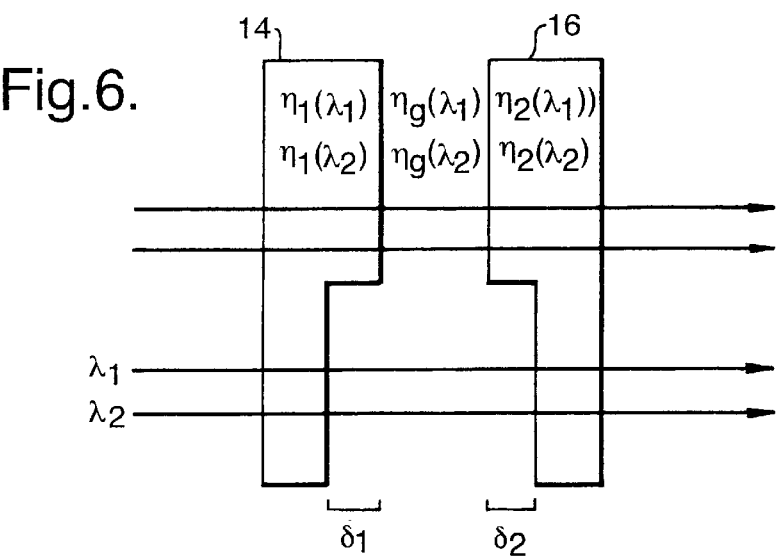
FIG. 6 is a schematic, sectional illustration of the DOE of FIG. 1C for chromatic aberration correction for two wavelengths.

Chromatic aberration correction for two wavelengths will now be described with reference to FIG. 6, illustrating one pixel of the two aligned DOEs 14, 16. The phase retardation $\phi$, of light with wavelength $\lambda$ propagating through that pixel, is:

$$[n_1(\lambda) - n_g(\lambda)]d_1 + [n_2(\lambda) - n_g(\lambda)]d_2 = \frac{1}{2\pi}\lambda\phi \quad (6)$$

wherein $n_1(\lambda)$, $n_g(\lambda)$, $n_2(\lambda)$ are the refractive indices of the materials along the light path, and $d_1$ and $d_2$ are the etched depths.

When light with two different wavelengths $\lambda_1$ and $\lambda_2$ is propagated through the pixel, the phase retardations $\phi_1$ and $\phi_2$ of the two wavelengths are given by the ma equation:

$$(n - n_g)d = \frac{1}{2\pi}\lambda\phi \quad (7)$$

wherein:

$$n = \begin{bmatrix} n_1(\lambda_1) & n_2(\lambda_1) \\ n_1(\lambda_2) & n_2(\lambda_2) \end{bmatrix}$$

$$n_g = \begin{bmatrix} n_g(\lambda_1) & n_g(\lambda_1) \\ n_g(\lambda_2) & n_g(\lambda_2) \end{bmatrix}$$

$$d = \begin{bmatrix} d_1 \\ d_2 \end{bmatrix}$$

$$\lambda\phi = \begin{bmatrix} \lambda_1(\phi_1 + m_1 \cdot 2\pi) \\ \lambda_2(\phi_2 + m_2 \cdot 2\pi) \end{bmatrix}$$

The elements of the n matrix are the refractive indices of the dispersive materials for the two wavelengths. The elements of the $n_g$ matrix are the refractive indices of the intermediate material for the two wavelengths. The elements of the d matrix are the etched thickness of the two DOEs. The elements of the $\lambda\phi$ matrix are the required phases for the two wavelengths, multiplied by the wavelengths $m_1$ and $m_2$ are some arbitrary integers. The phase values can be the same or different, and consequently, the DOE behavior will be the same or different for both wavelengths.

Solving equation (7) for the required etched depths d in the two DOEs, we obtain:

$$d = \frac{1}{2\pi}(n - n_g)^{-1}\lambda\phi \quad (8)$$

The etched depths of the two DOEs calculated by equation (7) cause the suitable phase retardations $\phi_1$ and $\phi_2$ for the two wavelengths simultaneously.

For investigation of the overall behavior of DOE thickness, equation (8) is expressed explicitly:

$$d_1 = \frac{[n_2(\lambda_2) - n_g(\lambda_2)]\frac{\lambda_1\phi_1}{2\pi} - [n_2(\lambda_1) - n_g(\lambda_1)]\frac{\lambda_2\phi_2}{2\pi}}{[n_1(\lambda_1) - n_g(\lambda_1)][n_2(\lambda_2) - n_g(\lambda_2)]} \quad (9)$$
$$- [n_1(\lambda_2) - n_g(\lambda_2)][n_2(\lambda_1) - n_g(\lambda_1)]$$

-continued $$d_2 = \frac{[n_1(\lambda_2) - n_g(\lambda_2)]\frac{\lambda_1\phi_1}{2\pi} - [n_1(\lambda_1) - n_g(\lambda_1)]\frac{\lambda_2\phi_2}{2\pi}}{[n_1(\lambda_1) - n_g(\lambda_1)][n_2(\lambda_2) - n_g(\lambda_2)]}$$
$$[n_1(\lambda_2) - n_g(\lambda_2)][n_2(\lambda_1) - n_g(\lambda_1)]$$

The minimum absolute thickness is achieved when the denominator of the equation (9) is set to a maximum. The denominator consists of two expressions; each expression is made up of two multiples.

For normal dispersive materials where the refractive index is higher for shorter wavelength, $n(\lambda)$ is a decreasing function. If the intermediate material is air, $n_g$ equals 1. Assuming that $\lambda_2 > \lambda_1$, each of the two expressions consists of multiples of a high value and a low value. The maximum value of the denominator occurs when one material will have a high dispersion and the other material will have a low dispersion.

This method can be expanded for more than two wavelengths. More degrees of freedom, and consequently more flexibility when using more than two wavelengths, can be obtained when other configurations of pixel shapes with multi-layers etching are used.

Figure 7:
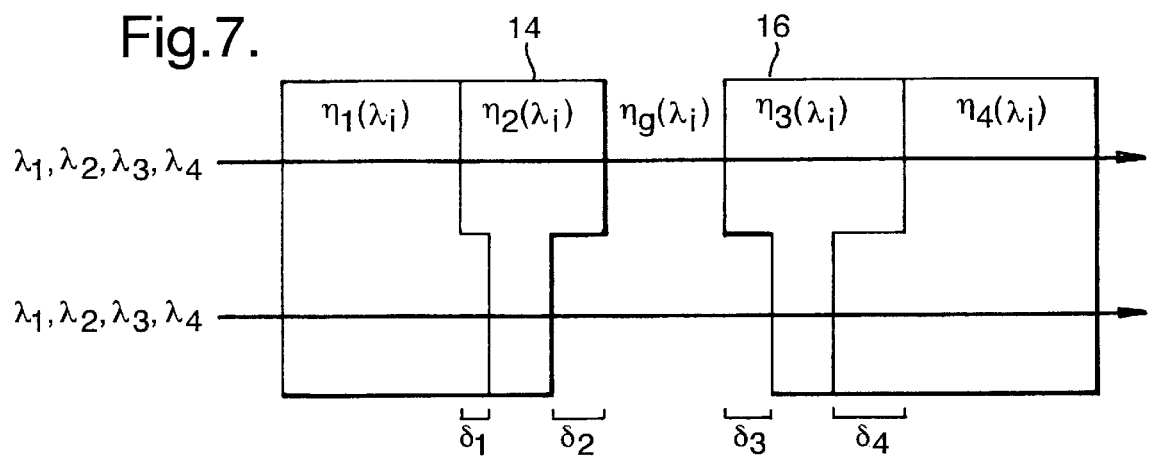
FIG. 7 is a schematic, sectional illustration of a DOE etched on two sides for chromatic aberration correction for two wavelengths.

FIG. 7 shows one pixel, consisting of two aligned, etched elements with an etched layer on two sides of each element. In this configuration, the phase retardation of light with wavelength $\lambda$ propagating through that pixel is:

$$\Delta = [n_1(\lambda) - n_2(\lambda)]d_1 + [n_g(\lambda) - n_2(\lambda)] \quad (10)$$
$$d_2 + [n_g(\lambda) - n_3(\lambda)]d_3 + [n_4(\lambda) - n_3(\lambda)]d_4 = \frac{1}{2\pi}\lambda\phi$$

Four similar equations can be written for four different wavelengths. Solving these equations for the d values will give the required thickness in each layer of the two substrates. The phase values for each wavelength can be the same or different, as mentioned earlier.

Adding more layers of different materials adds more degrees of freedom and enables the possibility of designing the DOE for more wavelengths.

As an example, the thicknesses of a binary DOE for two wavelengths was calculated. A binary DOE has two levels only, causing two phase retardations: 0 or $\pi$. The two wavelengths are $\lambda_1$=543.5 nm and $\lambda_2$=632.8 nm of the He—Ne laser. The materials for the two DOEs are BK7 glass and $As_2S$. The intermediate material is air. The corresponding refractive indices of the materials for the wavelengths are shown in Table 1:

TABLE 1

The Refractive Indices of the DOE Material for Two Wavelengths

| Glass | $\lambda_1$ = 543.5 nm | $\lambda_2$ = 632.8 nm |
| --- | --- | --- |
| BK7 | $n_1(\lambda_1)$ = 1.51885 | $n_1(\lambda_2)$ = 1.51509 |
| $As_2S$ | $n_2(\lambda_1)$ = 2.71445 | $n_2(\lambda_2)$ = 2.60615 |

Equation 6 was used to calculate the DOE thickness for all combinations of phases for the two wavelengths. The optimized integral numbers $m_1$ and $m_2$, that give the minimal overall thickness value of the combined DOE, were chosen for these calculations.

Positive and negative thickness values mean adding to, or etching the substrate, respectively. Considering the maximum positive value as the zero point, and all other values negative in reference to it, therefore microlithography etching process can be applied.

The following Table 2 contains the results of the calculations of the thicknesses $d_1$ and $d_2$ in microns for the two materials for all phase-value combinations. Table 2 also shows the integral numbers $m_1$ and $m_2$ and the minimal thicknesses $d'_1$ and $d'_2$ after optimization. It can be seen that the optimization process diminishes the overall thickness by one order of magnitude.

TABLE 2

The Required Etched Depths of the Combined DOE for Different Phase Combinations of the Two Wavelengths, before and after Optimization

| $\phi_1$ [rad] | $\phi_2$ [rad] | $m_1$ | $m_2$ | $d_1$ [$10^{-6}$ m] | $d_2$ [$10^{-6}$ m] | $m_1$ | $m_2$ | $d'_1$ [$10^{-6}$ m] | $d'_2$ [$10^{-6}$ m] |
|---|---|---|---|---|---|---|---|---|---|
| 0 | 0 | 0 | 0 | 0 | 0 | 0 | 0 | 0 | 0 |
| 0 | π | 0 | 0 | 10.9064 | −3.3007 | −3 | −3 | −1.8786 | −0.3825 |
| π | 0 | 0 | 0 | −8.7755 | 2.843 | −3 | −2 | 0.2523 | −0.8689 |
| π | π | 0 | 0 | 2.1308 | −0.4864 | −1 | −1 | −2.1308 | 0.4864 |

Figure 8:
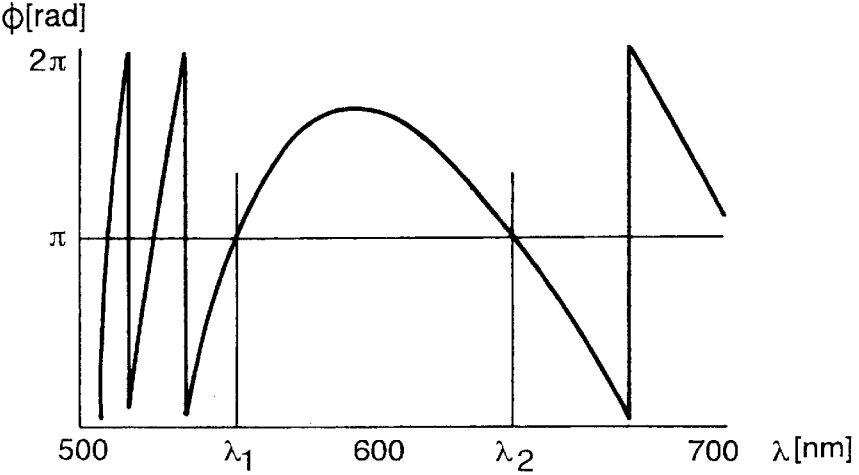
FIG. 8 is a graph showing phase changes as a function of wavelengths generated by an element of the DOE of FIG. 7.

FIG. 8 shows the simulated response of the DOE for different wavelengths, where $\lambda_1$ and $\lambda_2$ are the wavelengths for which it was designed. The phase retardations required in this case are n for the two wavelengths. It can be seen that the phase retardations for these wavelengths are n as required, but the phase changes are sharp for other wavelengths. Simulation shows that for a light source with a bandwidth of 2 nm, the phase retardation changes are less than 1%. All other wavelengths will suffer strong chromatic aberration and degradation in efficiency. Other phase combinations show similar behavior.

The response of the phase values to errors in fabrication is calculated by:

$$\Delta\phi = \frac{2\pi}{\lambda}\{[n_1(\lambda) - n_g(\lambda)]\Delta d_1 + [n_2(\lambda) - n_g(\lambda)]\Delta d_2\} \quad (11)$$

This equation shows that the error response is similar to, or less than, that in other types of DOEs, because it is a function of the two independent variables $d_1$ and $d_2$.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

APPENDIX A

The following program listing, written in PASCAL programming language, is incorporated herein as a part of the present patent application, as a portion of the description of the best mode for carrying out the invention:

```
{$N+}
uses graph,crt;
const
    Pi=3.14159;
        lamda0=0.55e−6;
        A01=2.4549347;
        A11=−8.3372034e−3;
        A21=1.6841270e−2;
        A31=5.0168527e−4;
```

APPENDIX A-continued

```
        A41=−1.4413749e−5;
        A51=2.0771351e−6;
        A02=1.0;
        A12=0;
        A22=0;
        A32=0;
        A42=0;
        A52=0;
        A03=2.718928;
        A13=2.2108077e−2;
        A23=1.0592509e−2;
        A33=1.0816965e−4;
        A43=−1.6472538e−6;
        A53=5.9240991e−7;
        A01=2.4498259;
        A11=1.0128610e−2;
        A21=1.8753684e−2;
        A31=1.1999618e−3;
        A41=8.8610291e−5;
        A51=9.8139193e−6;
        A03−2.9177579;
        A13=−1.1483287e−2;
        A23=3.3825845e−2;
        A33=2.5277439e−3;
        A43=−1.7332899e−4;
        A53=2.1465274e−5;
        A03=3.5278149;
        A13=1.7049614e−2;
        A23=4.2895039e−2;
        A33=1.9248178e−3;
        A43=7.5388918e−5;
        A53=1.3032008e−5;
        A01=2.2718929;
        A11=−1.0108077e−2;
        A21=1.0592509e−2;
        A31=2.0816965e−4;
        A41=7.6472538e−6;
        A51=4.9240991e−7;
type
    dat=file of real;
    ar=array[1..25] of real;
var
    mode,graphdriver:integer;
    deltax, aperture, Radius,max_phase,f:real;
    lens:dat;
    name:string;
function modd(a,b:real):real;
begin
    modd:=a−b*trunc(a/b);
end;
function power(x,n:real):extended;
var
    po:extended;
```

APPENDIX A-continued

```
begin
    if n<>0 then po:=exp(n*ln(x));
    if n=0 then po:=1;
    power:=po;
end;
function n (lamda,A0,A1,A2,A3,A4,A5:real):extended;
var
    n1:extended;
begin
    lamda:=lamda*1e6;
    n1:=A0;
    n1:=n1+A1*power(lamda,2);
    n1:=n1+A2/power(lamda,2);
    n1:=n1+A3/power(lamda,4);
    n1:=n1+A4/power(lamda,6);
    n1:=n1+A5/power(lamda,8);
    n1:=sqrt(n1);
    n:=n1;
end;
function
dn(lamda,n,A0,A1,A2,A3,A4,A5:real):extended;
var
    n1,n2:extended:
begin
    n2:=2*A1*1e+12*lamda;
    n2:=n2-2*A2*1e-12*power(lamda,-3);
    n2:=n2-4*A3*1e-24*power(lamda,-5);
    n2:=n2-6*A4*1e-36*power(lamda,-7);
    n2:=n2-8*A5*1e-48*power(lamda,-9);
    dn:=n2/(2*n);
end;
procedure thickness (lamda0,phi:real;var d1,d2:real);
var
    n1,n2,n3,dn1,dn2,dn3,
    a,b,c,dd1,dd2,dd3:real;
begin
        n1:=n(lamda0,A01,A11,A21,A31,A41,A51);
        n2:=n(lamda0,A02,A12,A22,A32,A42,A52);
        n3:=(lamda0,A03,A13,A23,A33,A43,A53);
        dn1:=dn(lamda0,n1,A01,A11,A21,A31,A41,A51);
        dn2:=dn(lamda0,n2,A02,A12,A22,A32,A42,A52);
        dn3:=dn(lamda0,n3,A03,A13,A23,A33,A43,A53);
        a:=dn1*lamda0;
        b:=dn2*lamda0;
        c:=dn3*lamda0;
        dd1:=n2-n1+a-b;
        dd2:=n3-n2+b-c;
        d1:=(n1-n2)+(n3-n2)*dd1/dd2;
        d2:=(n1-n2)*dd2/dd1+(n3-n2);
        d1:=phi*lamda0/(2*Pi*d1);
        d2:=phi*lamda0/(2*Pi*d2);
        {   writeln('d1=',d1);
            writeln('d2=',d2);
            writeln('phi=',phi);
            readln;}
end;
procedure combine;
var
    i,j:integer;
    phase,rad,x,y,d1,d2:real;
begin
    assign(lens,'lens.dat');
    rewrite(lens);
    for j:=-127 to 128 do
    for i:=-127 to 128 do
        begin
            x:=deltax*i;
            y:=deltax*j;
            rad:=sqr(x)+sqr(y);
            phase:=(2*Pi/lamda0)*(max_phase-rad/(2*f);
            phase:=modd(phase,2*Pi);
            thickness(lamda0,phase,d1,d2);
            write(lens,d1);
            write(lens,d2);
        end;
        close(lens);
    end;
    begin
        f:=1e-3;
        aperture:=4e-4;
        Radius:=aperture*sqrt(2);
        deltax:=aperture/256;
        max_phase:=sqr(Radius)/(2*f);
        combine;
    end.
```

What is claimed is:

1. A method for producing a diffractive optical element having multiple gratings formed from multiple optical materials, comprising:
    providing at least first and second optical materials;
    forming at least a first grating from the first optical material and a second grating from the second optical material, wherein
        each grating comprises a plurality of pixels, each pixel in an operating region of the grating having a substantially uniform depth and a phase retardation dependent on the depth,
        the substantially uniform pixel depths in at least one of the gratings are non-identical, and
        the gratings are aligned such that the pixels of the gratings are in substantially mutual registration so as to form a plurality of combined pixels, each of the combined pixels having an overall phase retardation resulting from the phase retardations of mutually registered pixels; and
    controlling wavelength dispersion by controlling the pixel depths so as to control a rate of change, with respect to wavelength, of differences among the overall phase retardations.

2. The method of claim 1, comprising forming said gratings on an optic having a known dispersion over a chosen wavelength range, wherein the wavelength dispersion of the diffractive optical element over the chosen wavelength range is such as to substantially correct for the dispersion of the optic.

3. The method of claim 1, comprising forming an optical element having a desired diffractive effect.

4. The method of claim 3, comprising forming an element having a generally invariant diffractive effect over a predetermined wavelength range.

5. The method of claim 1, comprising overlaying said second grating on said first grating on an outer surface of the element.

6. The method of claim 5, comprising etching said first grating into the surface of an optic formed of the first optical material.

7. The method of claim 6, comprising overlaying said first optical material onto an outer surface of an optic and etching a grating into the overlaid material.

8. The method of claim 6, comprising forming said second grating by overlaying a second optical material onto said first optical material and etching the gratings together into said first and second optical materials.

9. A diffractive optical element produced by the method of claim 5.

10. The element of claim 9, further comprising a refractive optic having a known dispersion over a chosen wavelength range, wherein the gratings are formed on a surface of the refractive optic and wherein the wavelength dispersion of the diffractive optical element over the chosen wavelength range substantially achromatizes the element.

11. The element of claim 10, wherein the refractive optic comprises a lens.

12. The element of claim 10, wherein the first grating is etched into the surface of the refractive optic, which comprises the first optical material.

13. The element of claim 10, wherein said first optical material is overlaid on the surface of the refractive optic, and said first grating is formed in the overlaid material.

14. The element of claim 10, wherein said second optical material is overlaid on the surface of the refractive optic and said second grating is formed in the overlaid material.

15. A diffractive optical element produced by the method of claim 1.

16. The element of claim 15, comprising a focusing diffractive optical element.

17. The element of claim 15, comprising a zone plate.

18. The element of claim 15, comprising a computer-generated hologram.

19. The element of claim 15, comprising a diffraction grating.

20. The method of claim 1 wherein the optical materials are provided and the pixel depths are controlled such that the diffractive optical element has desired differences among the overall phase retardations for two or more predetermined wavelengths.

21. The method of claim 1, wherein providing at least first and second optical materials comprises providing materials suitable for wavelengths in a visible range of light.

22. A diffractive optical element produced by the method of claim 21.

23. A method for producing a diffractive optical element having multiple gratings formed from multiple optical materials, comprising:

providing at least first and second optical materials;
   forming at least a first grating from the first optical material and a second grating from the second optical material, wherein
      each grating comprises a plurality of pixels, each pixel having a depth and a phase retardation dependent on the depth,
      the pixel depths in at least one of the gratings are non-identical, and
      the gratings are aligned such that the pixels of the gratings are in substantially mutual registration so as to form a plurality of combined pixels, each of the combined pixels having an overall phase retardation resulting from the phase retardations of mutually registered pixels; and
   controlling wavelength dispersion by controlling the pixel depths so as to control a rate of change, with respect to wavelength, of differences among the overall phase retardations, wherein:
      forming the first and second gratings comprises forming said first grating on a first outer surface of the element and forming said second grating on a second outer surface of the element.

24. The method of claim 23, comprising etching said gratings onto the first and second outer surfaces of the element using a dual-surface mask aligner.

25. A diffractive optical element produced by the method of claim 23.

26. A method for producing a diffractive optical element, comprising forming first and second gratings, substantially in mutual registration, of respective at least first and second optical materials, such that for two or more predetermined wavelengths, the diffractive optical element has phase retardations in a desired mutual relation, wherein first and second gratings are formed with respective first and second depths $d_1$ and $d_2$ substantially given by the equation:

$$\left\{\left[\frac{dn_1(\lambda)}{d\lambda} - \frac{n_1(\lambda)}{\lambda}\right] - \left[\frac{dn_3(\lambda)}{d\lambda} - \frac{n_3(\lambda)}{\lambda}\right]\right\}d_1 =$$
$$\left\{\left[\frac{n_2(\lambda)}{\lambda} - \frac{dn_2(\lambda)}{d\lambda}\right] + \left[\frac{dn_3(\lambda)}{d\lambda} - \frac{n_3(\lambda)}{\lambda}\right]\right\}d_2$$

wherein:

$n_1$ and $n_2$ are respective refractive indices of the first and second optical materials;
   $n_3$ is a refractive index of an ambient material surrounding the diffractive optical element; and
   $\lambda$ is an operating wavelength of the diffractive optical element.

27. The method of claim 26, wherein the first and second depths further satisfy the equation:

$$\frac{2\pi}{\lambda}[n_1(\lambda) - n_3(\lambda)]d_1 + \frac{2\pi}{\lambda}[n_2(\lambda) - n_3(\lambda)]d_2 = \phi(\lambda)$$

wherein $\phi(\lambda)$ is a difference in phase retardations, for a wavelength $\lambda$, for a diffractive optical element region relative to another diffractive optical element region.

28. A method for producing a diffractive optical element, comprising forming first and second gratings, substantially in mutual registration, of respective at least first and second optical materials, such that for two or more predetermined wavelengths, the diffractive optical element has phase retardations in a desired mutual relation, wherein the first and second gratings are formed with respective first and second depths $d_1$ and $d_2$ substantially given by the equations:

$$d_1 = \frac{[n_2(\lambda_2) - n_g(\lambda_2)]\frac{\lambda_1\phi_1}{2\pi} - [n_2(\lambda_1) - n_g(\lambda_1)]\frac{\lambda_2\phi_2}{2\pi}}{[n_1(\lambda_1) - n_g(\lambda_1)][n_2(\lambda_2) - n_g(\lambda_2)]}$$
$$[n_1(\lambda_2) - n_g(\lambda_2)][n_2(\lambda_1) - n_g(\lambda_1)]$$

$$d_2 = \frac{[n_1(\lambda_2) - n_g(\lambda_2)]\frac{\lambda_1\phi_1}{2\pi} - [n_1(\lambda_1) - n_g(\lambda_1)]\frac{\lambda_2\phi_2}{2\pi}}{[n_1(\lambda_1) - n_g(\lambda_1)][n_2(\lambda_2) - n_g(\lambda_2)]}$$
$$[n_1(\lambda_2) - n_g(\lambda_2)][n_2(\lambda_1) - n_g(\lambda_1)]$$

wherein:

$n_1(\lambda)$ and $n_2(\lambda)$ are respective refractive indices of the first and second optical materials and $n_g(\lambda)$ is a refractive index of an ambient material along the optical path,
   $\lambda_1$ and $\lambda_2$ are two predetermined wavelengths, and
   $\phi_1$ and $\phi_2$ are the respective phase retardations of the two predetermined wavelengths and have the desired mutual relation.

29. A diffractive optical element, comprising first and second optical materials in which respective first and second phase gratings are formed substantially in mutual registration, such that for predetermined wavelengths the diffractive optical element has desired phase retardations, wherein said first and second gratings have respective first and second depths $d_1$ and $d_2$ substantially given by the equation:

$$\left\{\left[\frac{dn_1(\lambda)}{d\lambda} - \frac{n_1(\lambda)}{\lambda}\right] - \left[\frac{dn_3(\lambda)}{d\lambda} - \frac{n_3(\lambda)}{\lambda}\right]\right\}d_1 =$$

-continued $$\left\{\left[\frac{n_2(\lambda)}{\lambda} - \frac{dn_2(\lambda)}{d\lambda}\right] + \left[\frac{dn_3(\lambda)}{d\lambda} - \frac{n_3(\lambda)}{\lambda}\right]\right\}d_2$$

wherein:
$n_1$ and $n_2$ are respective refractive indices of the first and second optical materials;
$n_3$ is a refractive index of an ambient material surrounding the diffractive optical element; and
$\lambda$ is an operating wavelength.

30. The diffractive optical element of claim 29, wherein the first and second depths further satisfy the equation:

$$\frac{2\pi}{\lambda}[n_1(\lambda) - n_3(\lambda)]d_1 + \frac{2\pi}{\lambda}[n_2(\lambda) - n_3(\lambda)]d_2 = \phi(\lambda)$$

wherein $\phi(\lambda)$ is a difference in phase retardations, for a wavelength $\lambda$, for a diffractive optical element region relative to another diffractive optical element region.

31. A diffractive optical element, comprising first and second optical materials in which respective first and second phase gratings are formed substantially in mutual registration, such that for predetermined wavelengths the diffractive optical element has desired phase retardations, wherein the first and second gratings have respective first and second depths $d_1$ and $d_2$ substantially given by the equations:

$$d_1 = \frac{[n_2(\lambda_2) - n_g(\lambda_2)]\frac{\lambda_1\phi_1}{2\pi} - [n_2(\lambda_1) - n_g(\lambda_1)]\frac{\lambda_2\phi_2}{2\pi}}{[n_1(\lambda_1) - n_g(\lambda_1)][n_2(\lambda_2) - n_g(\lambda_2)]}$$
$$[n_1(\lambda_2) - n_g(\lambda_2)][n_2(\lambda_1) - n_g(\lambda_1)]$$

$$d_2 = \frac{[n_1(\lambda_2) - n_g(\lambda_2)]\frac{\lambda_1\phi_1}{2\pi} - [n_1(\lambda_1) - n_g(\lambda_1)]\frac{\lambda_2\phi_2}{2\pi}}{[n_1(\lambda_1) - n_g(\lambda_1)][n_2(\lambda_2) - n_g(\lambda_2)]}$$
$$[n_1(\lambda_2) - n_g(\lambda_2)][n_2(\lambda_1) - n_g(\lambda_1)]$$

wherein:
$n_1(\lambda)$ and $n_2(\lambda)$ are respective refractive indices of the first and second optical materials and $n_g(\lambda)$ is a refractive index of an ambient material along the optical path,
$\lambda_1$ and $\lambda_2$ are two predetermined wavelengths, and
$\phi_1$ and $\phi_2$ are the respective phase retardations of the predetermined wavelengths and are the desired phase retardations.

32. A method for producing a diffractive optical element having multiple gratings formed from multiple optical materials, comprising:
providing at least first and second optical materials;
forming at least a first grating from the first optical material and a second grating from the second optical material, wherein
each grating comprises a plurality of pixels, each pixel having a depth and a phase retardation dependent on the depth,
the pixel depths in at least one of the gratings are non-identical, and
the gratings are aligned such that the pixels of the gratings are in substantially mutual registration so as to form a plurality of combined pixels, each of the combined pixels having an overall phase retardation resulting from the phase retardations of mutually registered pixels; and
controlling wavelength dispersion by controlling the pixel depths so as to control a rate of change, with respect to wavelength, of differences among the overall phase retardations, wherein:
the optical materials are provided and the pixel depths are controlled such that the rate of change with respect to wavelength of overall phase retardation differences is substantially zero at a central wavelength and the diffractive optical element is substantially achromatic over a first range of wavelengths surrounding the central wavelength.

33. The method of claim 32, further comprising identifying a second wavelength range, and wherein the optical materials are provided and the pixel depths are controlled such that the diffractive optical element further has a desired wavelength dispersion for wavelengths in the second wavelength range.

34. The method of claim 33, comprising forming said first and second gratings such that the wavelength dispersion of the diffractive optical element is substantially equal to zero at a predetermined wavelength.

35. A diffractive optical element produced by the method of claim 34.

36. A diffractive optical element produced by the method of claim 33.

37. A diffractive optical element produced by the method of claim 32.

38. A method for producing a diffractive optical element having multiple gratings formed from multiple optical materials, comprising:
providing at least first and second optical materials;
forming at least a first grating from the first optical material, a second grating from the second optical material and at least a third grating, wherein
each grating comprises a plurality of pixels, each pixel having a depth and a phase retardation dependent on the depth,
the pixel depths in at least one of the gratings are non-identical, and
the gratings are aligned such that the pixels of the gratings are in substantially mutual registration so as to form a plurality of combined pixels, each of the combined pixels having an overall phase retardation resulting from the phase retardations of mutually registered pixels; and
controlling wavelength dispersion beyond two degrees of freedom by controlling the pixel depths so as to control a rate of change, with respect to wavelength, of differences among the overall phase retardations.

39. A method for producing a diffractive optical element having multiple gratings formed from multiple optical materials, comprising:
identifying a wavelength ranged;
providing at least first and second optical materials;
forming at least a first grating from the first optical material and a second grating from the second optical material, wherein
each grating comprises a plurality of pixels, each pixel having a depth and a phase retardation dependent on the depth,
the pixel depths in at least one of the gratings are non-identical, and
the gratings are aligned such that the pixels of the gratings are in substantially mutual registration so as to form a plurality of combined pixels, each of the combined pixels having an overall phase retardation resulting from the phase retardations of mutually registered pixels; and controlling wavelength dispersion by controlling the pixel depths so as to control a rate of change, with respect to wavelength, of differences among the overall phase retardations, wherein the optical materials are provided and the pixel depths are controlled such that the diffractive optical element has desired differences among the overall phase retardations in a central wavelength and enhanced chromatic aberration over the identified wavelength range.

40. The method of claim 39 wherein the optical materials are provided and the pixel depths are controlled such that the rate of change with respect to wavelength of differences among the overall phase retardations is increasing over the identified wavelength range.

41. A diffractive optical element produced by the method of claim 40.

42. The method of claim 39 wherein the optical materials are provided and the pixel depths are controlled such that the rate of change with respect to wavelength of differences among the overall phase retardations is decreasing over the identified wavelength range.

43. A diffractive optical element produced by the method of claim 42.

44. A diffractive optical element produced by the method of claim 39.

45. A method for producing a diffractive optical element having multiple gratings formed from multiple optical materials, comprising:

providing at least first and second optical materials;

forming at least a first grating from the first optical material and a second grating from the second optical material, wherein each grating comprises a plurality of pixels, each pixel having a depth and a phase retardation dependent on the depth, the pixel depths in at least one of the gratings are non-identical, and the gratings are aligned such that the pixels of the gratings are in substantially mutual registration so as to form a plurality of combined pixels, each of the combined pixels having an overall phase retardation resulting from the phase retardations of mutually registered pixels, and controlling wavelength dispersion by controlling the pixel depths so as to control a rate of change, with respect to wavelength, of differences among the overall phase retardations, wherein:

the optical materials are provided and the pixel depths are controlled such that the diffractive optical element controls chromatic aberration in a first spatial region of the diffractive optical element in a first manner and controls the chromatic aberration in a second spatial region of the diffractive optical element in a second manner, and the first spatial region comprises mutually registered pixels of the first and second gratings in a first portion of the diffractive optical element and the second spatial region comprises mutually registered pixels of the first and second gratings in a second portion of the diffractive optical element.

46. The method of claim 45 wherein the optical materials are provided and the pixel depths are controlled such that the diffractive optical element cancels chromatic aberration in the first spatial region and enhances chromatic aberration in the second spatial region.

47. A diffractive optical element produced by the method of claim 46.

48. A diffractive optical element produced by the method of claim 45.

49. A method for producing a diffractive optical element having multiple gratings formed from multiple optical materials comprising:

providing at least first and second optical materials;

forming at least a first grating from the first optical material and a second grating from the second optical material, wherein each grating comprises a plurality of pixels, each pixel having a depth and a phase retardation dependent on the depth, the pixel depths in at least one of the gratings are non-identical, and the gratings are aligned such that the pixels of the gratings are in substantially mutual registration so as to form a plurality of combined pixels, each of the combined pixels having an overall phase retardation resulting from the phase retardations of mutually registered pixels; and controlling wavelength dispersion by controlling the pixel depths so as to control a rate of change, with respect to wavelength, of differences among the overall phase retardations, wherein:

the optical materials are provided and the pixel depths are controlled such that the diffractive optical element cancels chromatic aberration for at least one wavelength band and enhances chromatic aberration for at least one other wavelength band.

50. A diffractive optical element produced by the method of claim 49.

51. A method for producing a diffractive optical element having multiple gratings formed from multiple optical materials, comprising:

providing at least first and second optical materials;

forming at least a first grating from the first optical material and a second grating from the second optical material, wherein each grating comprises a plurality of pixels, each pixel having a depth and a phase retardation dependent on the depth, the pixel depths in at least one of the gratings are non-identical, and the gratings are aligned such that the pixels of the gratings are in substantially mutual registration so as to form a plurality of combined pixels, each of the combined pixels having an overall phase retardation resulting from the phase retardations of mutually registered pixels; and controlling wavelength dispersion by controlling the pixel depths so as to control a rate of change, with respect to wavelength, of differences among the overall phase retardations, wherein:

forming the first and second gratings comprises forming said gratings on an optic having a known dispersion over a chosen wavelength range, the wavelength dispersion of the diffractive optical element over the chosen wavelength range is such as to substantially correct for the dispersion of the optic, and the optic comprises another diffractive optic element designed for a wavelength outside of the chosen wavelength range.

52. A diffractive optical element, comprising:
at least three gratings, wherein the optical element is produced by a method including:
providing at least first and second optical materials,
forming a first grating from the first optical material, a second grating from the second optical material, and a third grating, wherein:
each grating comprises a plurality of pixels, each pixel having a depth and a phase retardation dependent on the depth,
the pixel depths in at least one of the gratings are non-identical, and
the gratings are aligned such that the pixels of the gratings are in substantially mutual registration so as to form a plurality of combined pixels, each of the combined pixels having an overall phase retardation resulting from the phase retardations of mutually registered pixels, and
controlling wavelength dispersion by controlling the pixel depths so as to control beyond two degrees of freedom a rate of change, with respect to wavelength, of differences among the overall phase retardations.

53. A diffractive optical element, comprising:
at least three gratings, wherein the optical element is produced by a method including:
providing at least first and second optical materials,
forming a first grating from the first optical material, a second grating from the second optical material, and a third grating, wherein:
each grating comprises a plurality of pixels, each pixel having a depth and a phase retardation dependent on the depth,
the pixel depths in at least one of the gratings are non-identical, and
the gratings are aligned such that the pixels of the gratings are in substantially mutual registration so as to form a plurality of combined pixels, each of the combined pixels having an overall phase retardation resulting from the phase retardations of mutually registered pixels, and
controlling wavelength dispersion by controlling the pixel depths so as to control a rate of change, with respect to wavelength, of differences among the overall phase retardations.

54. The diffractive optical element of claim 53, comprising at least a third optical material.

55. A diffractive optical element, comprising:
at least two gratings, wherein the optical element is produced by a method including:
providing at least first and second optical materials,
forming a first grating from the first optical material and a second grating from the second optical material, wherein:
each grating comprises a plurality of pixels, each pixel having a depth and a phase retardation dependent on the depth,
the pixel depths in at least one of the gratings are non-identical, and
the gratings are aligned such that the pixels of the gratings are in substantially mutual registration so as to form a plurality of combined pixels, each of the combined pixels having an overall phase retardation resulting from the phase retardations of mutually registered pixels, and
controlling wavelength dispersion by controlling the pixel depths so as to control a rate of change, with respect to wavelength, of differences among the overall phase retardations, wherein the diffractive optical element has desired differences among the overall phase retardations for two or more predetermined wavelengths.

56. A method for designing a diffractive optical element having multiple gratings substantially in mutual registration and formed from at least two optical materials, comprising:
choosing a first of the at least two optical materials in which to create a first grating having a first plurality of pixels of non-identical and substantially uniform depths in an operating region of the first grating;
choosing a second of the at least two optical materials in which to create a second grating having a second plurality of pixels of non-identical and substantially uniform depths in an operating region of the second grating;
determining the depths for each pixel in the first and second plurality such that:
the gratings, when in substantially mutual registration, form a plurality of combined pixels, each combined pixel having an overall phase retardation resulting from phase retardations of mutually registered pixels, and
a rate of change, with respect to wavelength, of differences among overall phase retardations has a designated value.

57. A method for designing a diffractive optical element having multiple gratings substantially in mutual registration and formed from at least two optical materials, comprising:
choosing a first of the at least two optical materials in which to create a first grating having a first plurality of pixels of non-identical depth;
choosing a second of the at least two optical materials in which to create a second grating having a second plurality of pixels of non-identical depth;
determining the depths for each pixel in the first and second plurality such that:
the gratings, when in substantially mutual registration, form a plurality of combined pixels, each combined pixel having an overall phase retardation resulting from phase retardations of mutually registered pixels, and
a rate of change, with respect to wavelength, of differences among overall phase retardations has a designated value, wherein the rate of change is substantially zero at a central wavelength and the designed diffractive optical element will be substantially achromatic over a range of wavelengths surrounding the central wavelength.

58. The method of claim 57, wherein the diffractive optical element will further have a desired wavelength dispersion for a set of wavelengths outside the range of wavelengths surrounding the central wavelength.

59. A method for designing a diffractive optical element having multiple gratings substantially in mutual registration and formed from at least two optical materials, comprising:
choosing a first of the at least two optical materials in which to create a first grating having a first plurality of grating regions of varying depth;
choosing a second of the at least two optical materials in which to create a second grating having a second plurality of grating regions of varying depth;
determining the depths for each grating region such that:
the gratings, when in substantially mutual registration, form a plurality of combined grating regions, each combined grating region having an overall phase retardation resulting from phase retardations of mutually registered grating regions, and a rate of change, with respect to wavelength, of differences among overall phase retardations has a designated value, and wherein first and second gratings satisfy the equation:

$$\left\{ \left[ \frac{dn_1(\lambda)}{d\lambda} - \frac{n_1(\lambda)}{\lambda} \right] - \left[ \frac{dn_3(\lambda)}{d\lambda} - \frac{n_3(\lambda)}{\lambda} \right] \right\} d_1 = \left\{ \left[ \frac{n_2(\lambda)}{\lambda} - \frac{dn_2(\lambda)}{d\lambda} \right] + \left[ \frac{dn_3(\lambda)}{d\lambda} - \frac{n_3(\lambda)}{\lambda} \right] \right\} d_2$$

wherein:

$d_1$ and $d_2$ are the first grating depth and second grating depth, respectively;

$n_1$ and $n_2$ are respective refractive indices of the first and second optical materials;

$n_3$ is a refractive index of an ambient material surrounding the diffractive optical element; and $\lambda$ is an operating wavelength of the diffractive optical element.

60. The method of claim 59, wherein the first and second gratings further satisfy the equation:

$$\frac{2\pi}{\lambda}[n_1(\lambda) - n_3(\lambda)]d_1 + \frac{2\pi}{\lambda}[n_2(\lambda) - n_3(\lambda)]d_2 = \phi(\lambda)$$

wherein $\phi(\lambda)$ is a difference in phase retardations, for a wavelength $\lambda$, for a diffractive optical element region relative to another diffractive optical element region.

61. A method for designing a diffractive optical element having phase retardations in a desired mutual relation for two or more predetermined wavelengths, comprising:

choosing first and second wavelengths;

choosing first and second phase retardations corresponding to the first and second wavelengths;

choosing a first optical material having a first index of refraction;

choosing a second optical material having a second index of refraction;

determining grating depths for a first grating to be formed in the first optical material; and determining grating depths for a second grating to be formed in the second optical material, wherein the following equation is satisfied $$d_1 = \frac{[n_2(\lambda_2) - n_g(\lambda_2)]\frac{\lambda_1 \phi_1}{2\pi} - [n_2(\lambda_1) - n_g(\lambda_1)]\frac{\lambda_2 \phi_2}{2\pi}}{[n_1(\lambda_1) - n_g(\lambda_1)][n_2(\lambda_2) - n_g(\lambda_2)] - [n_1(\lambda_2) - n_g(\lambda_2)][n_2(\lambda_1) - n_g(\lambda_1)]}$$

$$d_2 = \frac{[n_1(\lambda_2) - n_g(\lambda_2)]\frac{\lambda_1 \phi_1}{2\pi} - [n_1(\lambda_1) - n_g(\lambda_1)]\frac{\lambda_2 \phi_2}{2\pi}}{[n_1(\lambda_1) - n_g(\lambda_1)][n_2(\lambda_2) - n_g(\lambda_2)] - [n_1(\lambda_2) - n_g(\lambda_2)][n_2(\lambda_1) - n_g(\lambda_1)]}$$

wherein:

$d_1$ and $d_2$ are the first grating depth and second grating depth, respectively;

$n_1(\lambda)$ and $n_2(\lambda)$ are respective refractive indices of the first and second optical materials and $n_g(\lambda)$ is a refractive index of an ambient material along the optical path, $\lambda_1$ and $\lambda_2$ are the first and second wavelengths, and $\phi_1$ and $\phi_2$ are the first and second phase retardations of the first and second wavelengths.

62. A method for producing a diffractive optical element, comprising forming x number of gratings, substantially in mutual registration, of at least two and up to x number of optical materials, such that for x number of predetermined wavelengths, the diffractive optical element has phase retardations in a desired mutual relation, wherein:

x is at least 3;

the gratings are formed with respective depths $d_1, d_2, \ldots d_x$ substantially given by the equation $$\vec{d} = \frac{1}{2\pi} \cdot (\vec{n} - \vec{n}_g)^{-1} \cdot \vec{\lambda \phi},$$

and further wherein:

$$\vec{n} = \begin{bmatrix} n_1(\lambda_1) & n_2(\lambda_1) & \ldots & n_x(\lambda_1) \\ n_1(\lambda_2) & n_2(\lambda_2) & \ldots & n_x(\lambda_2) \\ \vdots & \vdots & & \vdots \\ n_1(\lambda_x) & n_2(\lambda_x) & \ldots & n_x(\lambda_x) \end{bmatrix},$$

$$\vec{n}_g = \begin{bmatrix} n_g(\lambda_1) & n_g(\lambda_1) & \ldots & n_g(\lambda_1) \\ n_g(\lambda_2) & n_g(\lambda_2) & \ldots & n_g(\lambda_2) \\ \vdots & \vdots & & \vdots \\ n_g(\lambda_x) & n_g(\lambda_x) & \ldots & n_g(\lambda_x) \end{bmatrix},$$

$$\vec{d} = \begin{bmatrix} d_1 \\ d_2 \\ \vdots \\ d_x \end{bmatrix},$$

$$\vec{\lambda \phi} = \begin{bmatrix} \lambda_1(\phi_1 + 2\pi m_1) \\ \lambda_2(\phi_2 + 2\pi m_2) \\ \vdots \\ \lambda_x(\phi_x + 2\pi m_x) \end{bmatrix},$$

$m_1, m_2, \ldots m_x$ are arbitrary integers, $n_1(\lambda), n_2(\lambda), \ldots n_x(\lambda)$ are respective refractive indices of the optical materials forming the x number of gratings, $n_g(\lambda)$ is a refractive index of an ambient material along the optical path, $\lambda_1, \lambda_2, \ldots \lambda_x$ are the x number of predetermined wavelengths, and $\phi_1, \phi_2, \ldots \phi_x$ are the respective phase retardations of the x number of predetermined wavelengths and have the desired mutual relation.

63. The method of claim 62, wherein forming x number of gratings comprises forming each grating from a different optical material.

64. A diffractive optical element produced by the method of claim 62.

65. A method for designing a diffractive optical element having x number of gratings substantially in mutual registration and formed from at least two and up to x number of optical materials, and further having phase retardations in a desired mutual relation for x number of predetermined wavelengths, comprising:

choosing x number of wavelengths;

choosing x number of phase retardations corresponding to the x number of wavelengths;

choosing optical materials in which to create the x number of gratings; and determining grating depths to be formed in the optical materials, wherein the following equation is satisfied:

$$\vec{d} = \frac{1}{2\pi} \cdot (\vec{n} - \vec{n}_g)^{-1} \cdot \vec{\lambda\phi},$$

and wherein:

$$\vec{n} = \begin{bmatrix} n_1(\lambda_1) & n_2(\lambda_1) & \ldots & n_x(\lambda_1) \\ n_1(\lambda_2) & n_2(\lambda_2) & \ldots & n_x(\lambda_2) \\ \vdots & \vdots & & \vdots \\ n_1(\lambda_x) & n_2(\lambda_x) & \ldots & n_x(\lambda_x) \end{bmatrix},$$

$$\vec{n}_g = \begin{bmatrix} n_g(\lambda_1) & n_g(\lambda_1) & \ldots & n_g(\lambda_1) \\ n_g(\lambda_2) & n_g(\lambda_2) & \ldots & n_g(\lambda_2) \\ \vdots & \vdots & & \vdots \\ n_g(\lambda_x) & n_g(\lambda_x) & \ldots & n_g(\lambda_x) \end{bmatrix},$$

$$\vec{d} = \begin{bmatrix} d_1 \\ d_2 \\ \vdots \\ d_x \end{bmatrix},$$

$$\vec{\lambda\phi} = \begin{bmatrix} \lambda_1(\phi_1 + 2\pi m_1) \\ \lambda_2(\phi_2 + 2\pi m_2) \\ \vdots \\ \lambda_x(\phi_x + 2\pi m_x) \end{bmatrix},$$

$m_1, m_2, \ldots m_x$ are arbitrary integers, $n_1(\lambda), n_2(\lambda), \ldots n_x(\lambda)$ are respective refractive indices of the optical materials forming the x number of gratings, $n_g(\lambda)$ is a refractive index of an ambient material along the optical path, $\lambda_1, \lambda_2, \ldots \lambda_x$ are the x number of wavelengths, $\phi_1, \phi_2, \ldots \phi_x$ are the x number of phase retardations corresponding to the x number of wavelengths, and x is at least 3.

66. The method of claim 65, wherein choosing optical materials comprises choosing a different optical material for each grating.

\* \* \* \* \*

UNITED STATES PATENT AND TRADEMARK OFFICE
CERTIFICATE OF CORRECTION

PATENT NO.    : 6,707,608 B1
DATED         : March 16, 2004
INVENTOR(S)   : Yoel Arieli et al.

It is certified that error appears in the above-identified patent and that said Letters Patent is hereby corrected as shown below:

Column 15,
Lines 47-48, please replace "the predetermined" with -- the two predetermined --

Signed and Sealed this

Fourth Day of January, 2005

JON W. DUDAS
*Director of the United States Patent and Trademark Office*